(12) United States Patent  
Rodriguez, II et al.

(10) Patent No.: US 11,609,441 B1  
(45) Date of Patent: Mar. 21, 2023

(54) EYEWEAR WAVEGUIDE WITH REFLECTOR

(71) Applicants: Jonathan M. Rodriguez, II, Los Angeles, CA (US); Julio Cesar Castañeda, Redondo Beach, CA (US); Samuel Bryson Thompson, Downers Grove, IL (US); Michael Christian Ryner, Santa Monica, CA (US)

(72) Inventors: Jonathan M. Rodriguez, II, Los Angeles, CA (US); Julio Cesar Castañeda, Redondo Beach, CA (US); Samuel Bryson Thompson, Downers Grove, IL (US); Michael Christian Ryner, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 258 days.

(21) Appl. No.: 16/425,204

(22) Filed: May 29, 2019

Related U.S. Application Data

(60) Provisional application No. 62/678,051, filed on May 30, 2018.

(51) Int. Cl.
```
G02C 7/00      (2006.01)
G02C 7/08      (2006.01)
G02C 5/00      (2006.01)
G02B 6/124     (2006.01)
G03B 21/14     (2006.01)
```
(52) U.S. Cl.
CPC .......... *G02C 7/088* (2013.01); *G02B 6/1245* (2013.01); *G02C 5/006* (2013.01); *G03B 21/142* (2013.01)

(58) Field of Classification Search
CPC ........ G02C 7/088; G02C 5/006; G02C 11/00; G03B 21/142; G02B 6/1245
USPC ........................................................... 351/158
See application file for complete search history.

(56) References Cited

U.S. PATENT DOCUMENTS

| | | | | |
|---|---|---|---|---|
| 2015/0234477 | A1* | 8/2015 | Abovitz ................ | A63F 13/428 382/103 |
| 2018/0149873 | A1* | 5/2018 | Edwin ................. | G02B 27/0172 |
| 2020/0278543 | A1* | 9/2020 | Schultz ................ | G02B 6/0026 |

* cited by examiner

*Primary Examiner* — Thomas K Pham  
*Assistant Examiner* — Henry A Duong  
(74) *Attorney, Agent, or Firm* — Culhane Meadows PLLC; Stephen J. Weed

(57) ABSTRACT

Eyewear including a frame, a projector supported by the frame, and a lens supported by the frame. The lens has a first surface facing an eye of the user and a second surface facing away from the eye of the user when the frame is worn. The lens also includes a waveguide defined by the first and second surfaces to receive light from the projector. An input light coupler and an output light coupler are on the first surface of the lens and at least one reflector is positioned on a second surface of the lens to redirect light received from the input coupler and/or the output coupler to redirect light having an angle of incidence with respect to the second surface of the lens that would result in that portion of the light exiting the waveguide through the second surface in the absence of the at least one reflector.

20 Claims, 7 Drawing Sheets

EYEWEAR WAVEGUIDE WITH REFLECTOR

CROSS-REFERENCE TO RELATED APPLICATION

This application claims priority to U.S. Provisional application Ser. No. 62/678,051 entitled EYEWEAR WAVEGUIDE WITH REFLECTOR, filed on May 30, 2018, the contents of which are incorporated fully herein by reference.

FIELD OF THE INVENTION

The present invention relates to eyewear and, more particularly, to eyewear for use with augmented reality.

BACKGROUND OF THE INVENTION

Augmented reality (AR) is a live direct or indirect view of a physical, real-world environment whose elements are augmented (or supplemented) by computer-generated images such as video or graphics. FIG. 2A illustrates an AR display system. A projector 122 projects light 202 containing an image toward an input coupling element 204 that bends light in order to trap the light within a waveguide 206 (e.g., of an eyewear lens 114). The light is internally reflected within the waveguide until it encounters an output coupling element 216 that causes light to exit the waveguide.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Figure 1:
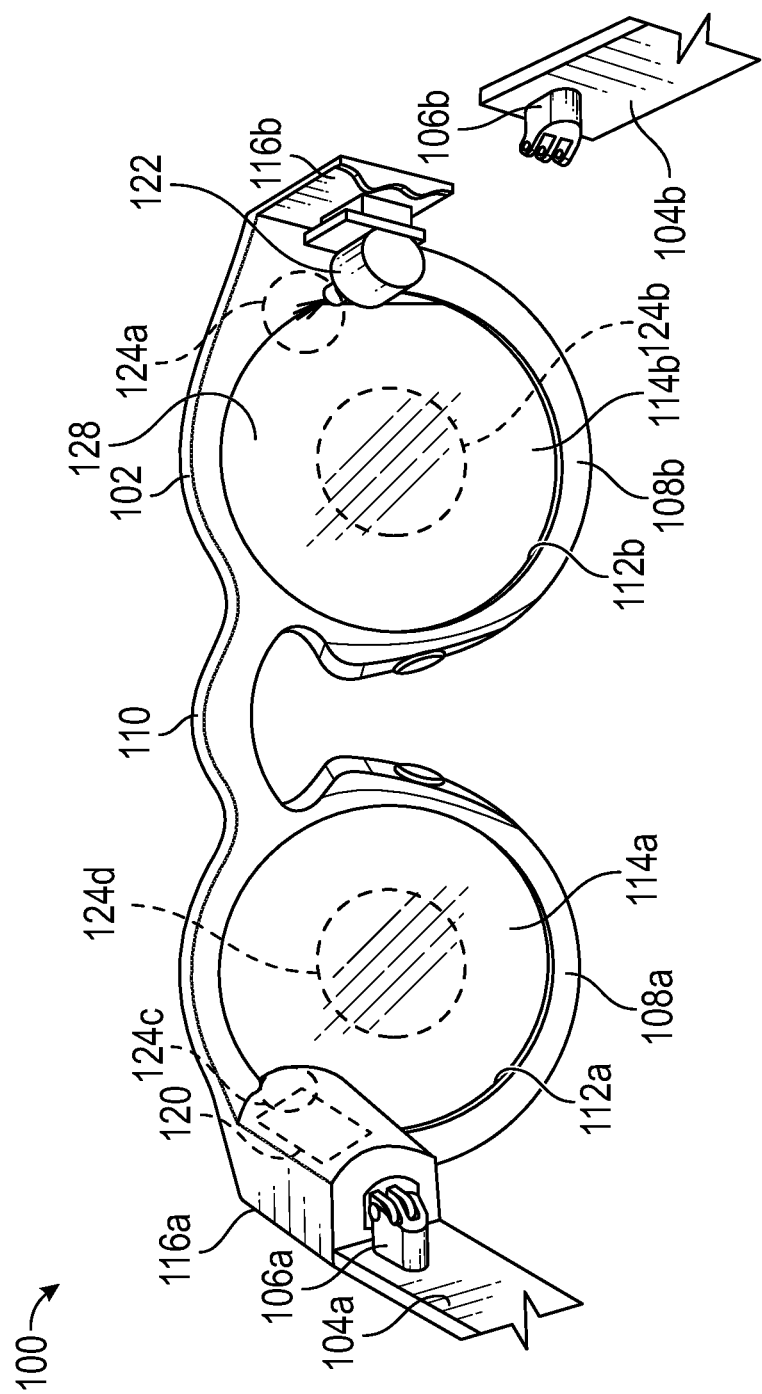
FIG. 1 is a perspective view of example eyewear.

In accordance with examples described herein, a reflector(s) such as a mirror is positioned on a surface of an eyewear lens to improve transmission of light through the lens, e.g., for use in augmented reality systems. The lens includes a first surface and a second surface defining at least one waveguide therebetween. An input light coupler is positioned on the first surface adjacent a perimeter to introduce light to the waveguide and an output light coupler is positioned on the first surface in a viewable area. A reflector is positioned on the second surface to redirect at least a portion of light received from the input light coupler and/or to redirect at least a portion of light reflected by the output light coupler.

The reflector(s) redirect light having an angle of incidence with respect to the second surface that would result in the light leaving the waveguide in the absence of the reflector. This results in more light ultimately reaching the user/wearer and, thus, improved efficiency and brighter images.

In one example, eyewear is described that includes a frame, a projector supported by the frame, a lens supported by the frame, at least one light coupler, and at least one reflector. The frame is configured to be worn on a head of a user and the projector is configured to project light. The lens has a first surface facing an eye of the user and a second surface facing away from the eye of the user when the frame is worn. The lens includes at least one waveguide defined by the first and second surfaces that is configured to receive the projected light. There is at least one light coupler for the at least one waveguide on the first surface of the lens and at least one reflector on the second surface of the lens corresponding to the at least one light coupler on the first surface of the lens. The at least one reflector is positioned to redirect toward the waveguide a portion of the projected light received from the at least one light coupler having an angle of incidence with respect to the second surface that would result in that portion of the projected light exiting the waveguide through the second surface in the absence of the at least one reflector.

In another example, a method for presenting an image on eyewear to be worn by a user is described. The eyewear includes a lens having first and second surfaces defining at least one waveguide where the first surface faces an eye of the user and the second surface faces away from the eye of the user when the eyewear is worn. An image is presented by coupling, with at least one light coupler on the first surface of the lens, light including the image at least one of into the waveguide or out of the waveguide and redirecting with at least one reflector on the second surface of the lens toward the waveguide at least a portion of the light received from the at least one light coupler having an angle of incidence with respect to the second surface of the lens that would result in that portion of the light exiting the waveguide through the second surface in the absence of the at least one reflector.

In another example, a method for forming eyewear to be worn by a user is described. The eyewear is formed by forming at least one light coupler on a first surface of a lens, the at least one light coupler configured to at least one of couple light into the waveguide or couple light out of the waveguide and forming at least one reflector on a second surface of the lens, the at least one reflector configured to redirect at least a portion of light from the at least one light coupler having an angle of incidence with respect to the second surface of the lens that would result in that portion of the light exiting the waveguide through the second surface in the absence of the at least one reflector.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The orientations of the eyewear device, associated components and any complete devices are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

The term "light coupler" refers to any structure that facilitates or promotes the transition of light from one medium to another. When used in the context of a waveguide, light couplers may be any structure created in, applied to, or otherwise formed on the waveguide which facilitates or promotes the input of light into the waveguide or the output of light from the waveguide. Light couplers may be formed from the material of the waveguide, e.g., by molding or etching a surface of the waveguide for form facets, surfaces, or other structures which promote the input or output of light. Light couplers may also be formed from materials or layers which are applied to a surface of the waveguide.

Reference now is made in detail to the examples illustrated in the accompanying drawings and discussed below.

FIG. 1 depicts a rear view of example eyewear 100. The illustrated eyewear 100 includes a frame 102, a left temple 104a extending from a left side of the frame 102, and a right temple 104b extending from a right side of the frame. The left temple 104a is connected to the frame 102 by a left hinge 106a and the right temple 104b is connected to the frame 102 by a right hinge 106b. The illustrated eyewear 100 is in a form configured for wearing by a user, which are eyeglasses in the example of FIG. 1. The eyewear 100 can take other forms and may incorporate other types of frameworks, for example, a headgear, a headset, or a helmet.

The frame 102 includes a left rim 108a connected to a right rim 108b via a bridge 110 adapted for a nose of the user. The left and right rims 108a, b include respective apertures 112a, b which hold respective lenses 114a, b. As used herein, the term lens is meant to cover transparent or translucent pieces of glass or plastic defining waveguides having curved and flat surfaces that cause light to converge/diverge or that cause little or no convergence/divergence.

The eyewear 100 includes a left housing 116a adjacent the left lateral side of the frame 102 and a right housing 116b adjacent the right lateral side of the frame 102. The housings 116a, b may be integrated into the frame 102 on the respective sides (as illustrated) or implemented as separate components attached to the frame 102 on the respective sides. Alternatively, the housings 116a, b may be integrated into temples 104a, b attached to the frame 102. The housings 116 may contain/cover electronic components 120 including, for example, a projector 122.

The eyewear 100 additionally includes one or more reflectors on the lenses 114a, b. For example, the eyewear 100 may include a first reflector 124a on an outer surface of the right lens 114b adjacent a perimeter of the right lens, a second reflector 124b on the outer surface of the right lens 114b adjacent a viewing area of the right lens when the eyewear 100 if worn by the user, a third reflector 124c on an outer surface of the left lens 114a adjacent a perimeter of the left lens, and a fourth reflector 124d on the outer surface of the left lens 114a adjacent a viewing area of the left lens when the eyewear 100 if worn by the user. The first reflector 124a redirects/reflects a portion of light received from the projector 122 via an input coupler (not shown in FIG. 1) on an inner surface of the right lens 114b adjacent the perimeter of the right lens. The second reflector 124b redirects/reflects a portion of light received from an output coupling element (not shown in FIG. 1) on the inner surface of the right lens 114b. The third reflector 124 redirects/reflects a portion of light received via an input coupler (not shown in FIG. 1) on an inner surface of the left lens 114a adjacent the perimeter of the left lens. The fourth reflector 124d redirects/reflects a portion of light received from an output coupling element (not shown in FIG. 1) on the inner surface of the left lens 114a.

The housings 116 may additionally contain at least a portion of the reflectors adjacent the perimeter of the lenses (e.g., reflectors 124a, c) so that they are not visible to the user. The reflectors 124a, c may have a relatively high level of reflectance (e.g., up to 100%) because they are not in the central viewing area of the lenses 114. The reflectors 124b, d may have a relatively low level of reflectance (e.g., less than 15%) so as not to interfere with the user's ability to see through the lenses 114. Suitable degrees of reflectance will be understood by one of skill in the art from the description herein.

The eyewear 100 includes a projection image display system. During operation, an optical source such as the projector 122 projects an image onto a respective lens. The projector 122 may be a three-color laser projector using a scanning mirror or galvanometer. The lens includes an input light coupler on a surface of the lens facing the projector 122 and an output light coupler in a viewing area of the lens 114 on the same surface of the lens. The front and back surfaces of the lens define a waveguide that internally reflects light beams have an angle of incidence below a threshold level. The input light coupler introduces light containing an image into the waveguide and an output light coupler allows light to pass out of the waveguide toward the eye of the user in order for the user to view the image.

Figure 2A:
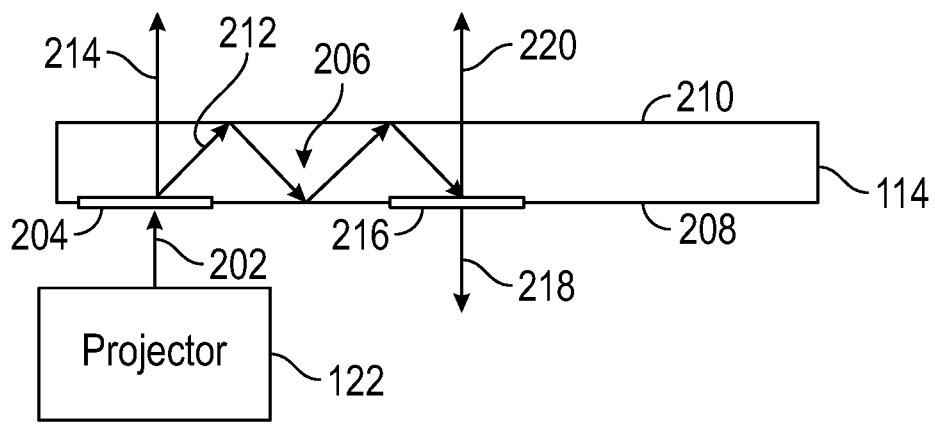
FIG. 2A is a block diagram of a prior art lens display.

FIG. 2A depicts a conventional display system 200. In the conventional display system 200, a projector 122 projects light 202 containing an image toward an input coupling element 204 (e.g., a diffractive grating) that couples light into a waveguide 206 (e.g., of an eyewear lens 114 having a first surface 208 and a second surface 210, between which the waveguide 206 is defined). The input coupling element 204 redirects portions of the light 206 to create at least two different light paths. A first light path 212 is created by the coupling element such that it has an angle of incidence within respect to the first and second surfaces 208 and 210 that results in the first light path being contained within the waveguide 206. A second light path 214 is created by the coupling element such that it has an angle of incidence within respect to the second surface 210 that results in the second light path 214 exiting the second surface 210 of the lens 114.

The first light path 212 is internally reflected within the waveguide 206 until it encounters an output coupling element 216 (e.g., diffractive grating) that causes at least a portion of the light 212 to exit the waveguide 206 of the lens 114 toward an eye of a wearer. The output coupling element 216 redirects portions of the light 212 to create at least two different light paths. A first light path 218 is created that passes through the output coupling element 216 toward the eye of the wearer and a second light path 220 is created that has an angle of incidence with respect to the second surface 210 that results in the second light path 220 exiting the second surface 210 of the lens 114. Thus, the user wearing the eyewear only sees the first portion of light 218 (of diminished brightness due to the loss of light along light paths 214 and 220). Additionally, security issues may arise if a third party intercepts the light paths 214 and 220 exiting the second surface 210, which would enable the third party to see what the wearer is seeing.

Figure 2B:
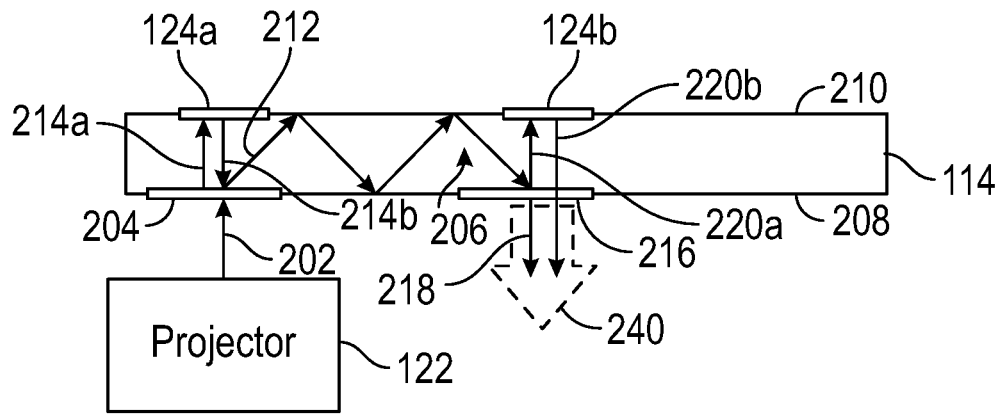
FIG. 2B is a block diagram of an example lens display.

FIG. 2B depicts an example lens display 230. The lens display 230 includes a projector 122 that projects light 202. The projector 122 projects the light 202 onto a coupling device 204 on the first surface 208 of the lens 114. The lens 114 defines the waveguide 206 between the first surface 208 of the lens 114 and the second surface 210 of the lens 114. In an example, the first surface 208 and the second surface 210 are coplanar. As used herein, the term lens is meant to cover transparent or translucent pieces of glass or plastic having curved and flat surfaces that cause light to converge/diverge or that cause little or no convergence/divergence.

The projector 122 projects light 202 containing an image toward the input coupling element 204 (e.g., a diffractive grating) that couples light into the waveguide 206 (e.g., of an eyewear lens 114 having a first surface 208 and a second surface 210, between which the waveguide 206 is defined). The input coupling element 204 redirects portions of the light 206 to create at least two different light paths. A first light path 212 is created by the coupling element such that it has an angle of incidence within respect to the first and second surfaces 208 and 210 that results in the first light path being contained within the waveguide 206.

A second light path 214a is created by the coupling element 204 such that it has an angle of incidence within respect to the second surface 210 that would result in the second light path 214a exiting the waveguide through the second surface 210 of the lens 114 absent a reflector 124a on the second surface 210. The reflector 124a on the second surface 210, however, reflects the second light path 214a back toward the waveguide as light path 214b. Thus, reflector 124a reintroduces light that would otherwise be lost, thereby increasing brightness.

The first light path 212 (along with portions of the reflected light path 214b) is internally reflected within the waveguide 206 until it encounters an output coupling element 216 (e.g., diffractive grating) that causes at least a portion of the light 212 to exit the waveguide 206 of the lens 114 toward an eye of a wearer. The output coupling element 216 redirects portions of the light 212 to create at least two different light paths. A first light path 218 is created that passes through the output coupling element 216 toward the eye of the wearer and a second light path 220a is created that has an angle of incidence with respect to the second surface 210 that would result in the second light path 220a exiting the second surface 210 of the lens 114 absent a reflector 124b on the second surface 210. The reflector 124b on the second surface 210, however, reflects the second light path 220a back toward the waveguide as light path 220b. Thus, reflector 124b reintroduces light that would otherwise be lost, thereby further increasing brightness.

The input coupling device 204 on the first surface 208 and the output coupling device 216 on the first surface 208 are light couplers and may be diffractive etchings or coating material applied to the first surface 208 such as single level diffractive gratings/coatings or multi-level diffractive gratings/coatings (e.g., holographic gratings/coatings) on the first surface 208 of the lens 114. Although illustrated as being on a small portion of the first lens surface 208, the input coupling device 204 and the output coupling device 216 may be two of many regions within an applied coating or a diffractive grating extending over the entire surface 208 of the lens 114 to selectively couple light in/out of the waveguide 206. Furthermore, additional coatings/layers such as protective coatings may be added.

Additionally, although FIG. 2B illustrates the input coupling device 204 on the first surface 208, the input coupling device 204 could be on the second surface 210. In this example, the projector 122 would project the light 202 onto the second surface 210 of the lens 114 for entry into the waveguide 206.

The reflector 124b on the second surface 210 of the lens 114 reflects at least a portion 220b of the second portion 220a back toward the wearer as a third portion. The reflected second portion 220b rejoins the first portion 218 to create brighter light 240 (e.g., a brighter image) for viewing by the wearer. Additionally, the brightness of the non-reflected second portion (if present) exiting the waveguide 206 is reduced, thereby decreasing the ability of third parties to see what the user wearing the eyewear is seeing.

The reflectors 124 may be a coating/mirror applied to one or more portions of the second surface 210. In an example, the reflectors 124 are a mirror coating applied to a region over at least one of the input coupling device 204 or the output coupling device 216. In an example, the reflectors 124 are coplanar to the waveguide 206. In an example, the reflectors 124 are tuned to reflect a desired portion of the light. In one example, the desired portion is at least 10 percent. In another example the reflected portion is at least 15 percent. In an example, the reflector 124a near a perimeter of the lens reflects substantially all the light and the reflector 124b in a viewable area reflects 5 to 20 percent of the indent light. In an example, the reflectors 124 reflect light having one or more particular wavelength intervals (e.g., one or more particular colors of light).

Figure 2C:
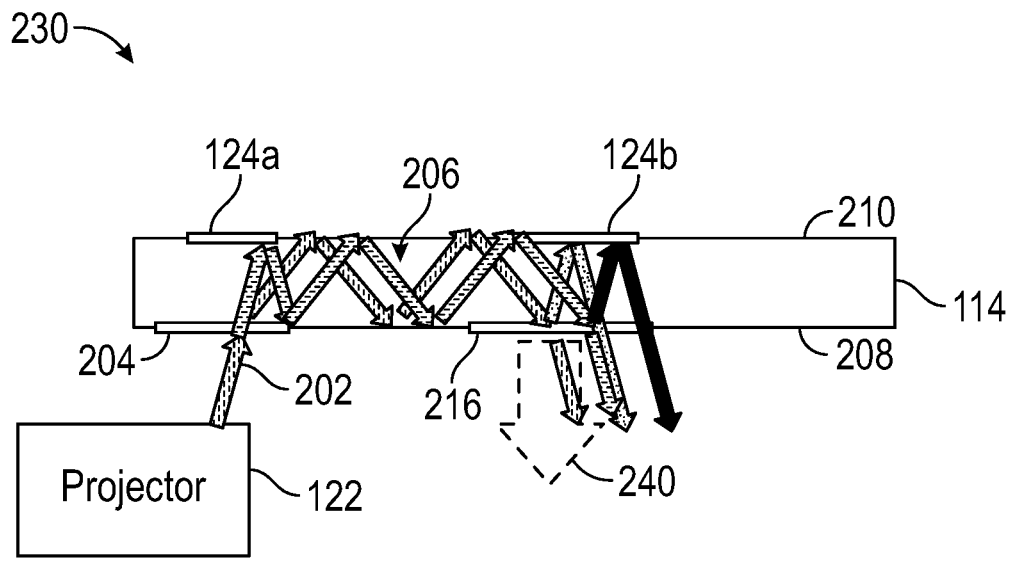
FIG. 2C is a block diagram of an example lens display representing additional paths of light created by reflectors.

FIG. 2C depicts the lens display 230 of FIG. 2B with internal reflections for a ray of light incident on the input light coupler 204 on the first surface 208 of the lens 114 at an angle of 15 degrees from perpendicular. The arrows with the vertical dashes illustrate light paths in a conventional waveguide system. The arrows with the horizontal dashes illustrate the additional paths of light created by introducing the reflector 124a near the perimeter of the lens 114. The arrows with the dots illustrate the additional paths of light created by introducing the reflector 124b 124a in the viewing area. The solid arrows illustrate the additional paths of light created by introducing both reflectors 124a and 124b.

Figure 3:
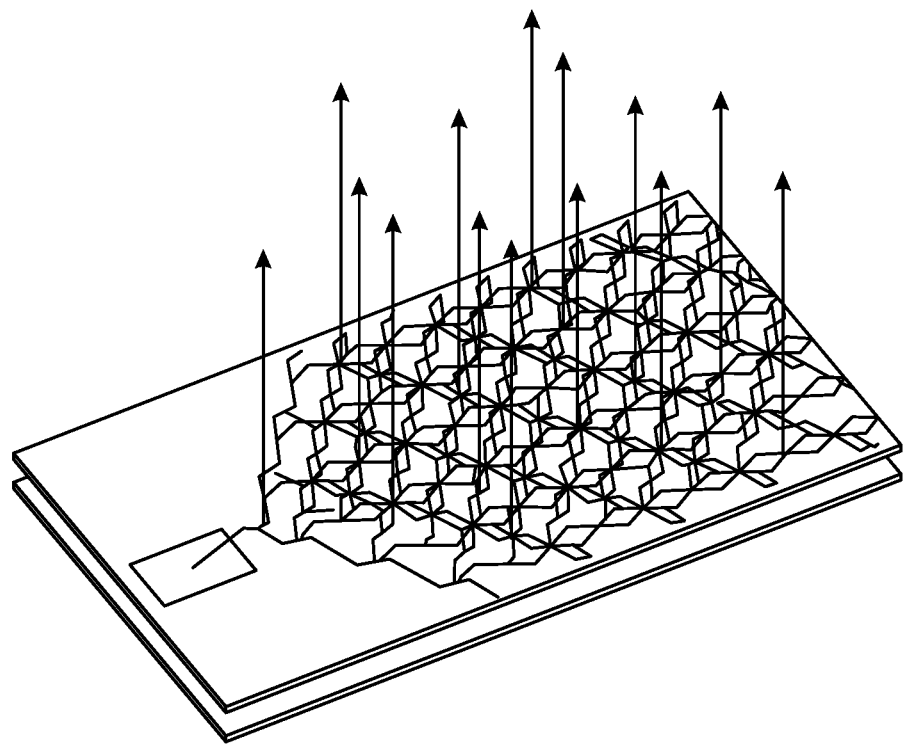
FIG. 3 is an illustration depicting an example of the paths of light created from a single path of light entering a waveguide and exiting through diffractive gratings.

FIG. 3 depicts an example of the many paths of light created from a single path of light entering a waveguide and exiting through diffractive gratings. Each place where a path splits results from the interaction of photons traveling along that path with a diffraction grating. At each interaction, a photon of light can either follow the $0^{th}$ order path (continuing along an ordinary course as if the diffraction grating were not present), a +1 order (bending in one direction), or a −1 order (bending in the opposite direction). As a stream of photons enter the system along the same input path, some of them take each of the many possible paths through the system, at random, resulting in a distribution that is ideally as uniform as possible but in practice typically results in a higher number of photons that choose paths with more $0^{th}$ th order interactions and fewer +1 or −1 interactions. Each interaction creates the potential for light to be directed away from the user.

Figure 4A:
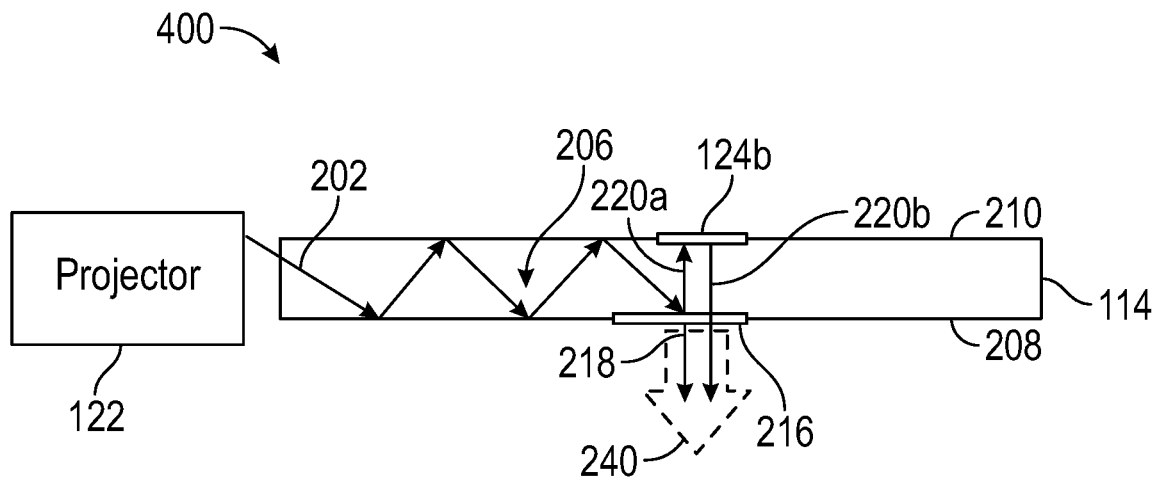
FIG. 4A is a block diagram of another example lens display.

FIG. 4A depicts another example lens display 400. In the example of FIG. 4, the projector 122 projects light 202 into an edge of lens 114 to enter the waveguide 206. This arrangement removes the need for an input coupling device. Functionality of the various components acting on the light 202 once within the waveguide 206 are as described above with reference to FIG. 2.

Figure 4B:
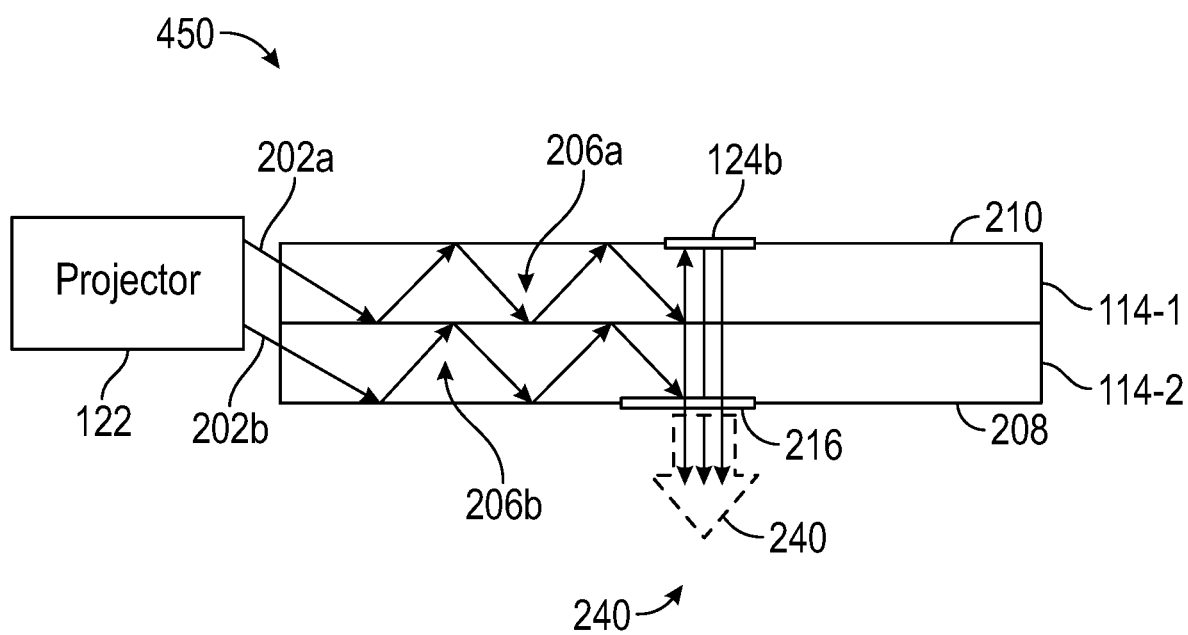
FIG. 4B is a block diagram of another example lens display.

FIG. 4B depicts another example lens display 450. In the example of FIG. 4B, the lens includes a first lens 114-1 and a second lens 114-2. The projector 122 projects a first spectrum of light (e.g., red and part of the green spectrum) into a first waveguide 206a of the first lens 114-1 and a second spectrum of light (e.g., blue and another part of the green spectrum) into a second waveguide 206b of the second lens 114-2. Although two lens/waveguides are illustrated, additional lens/waveguides may be used, e.g., three with one dedicated to red, one dedicated to blue, and one dedicated to green. Projector 122 may include a beam splitter for splitting the light 202 into the respective spectrums of light 202a and 202b being introduced into the waveguides 114a and 114b. Although one reflector 124 is illustrated in FIG. 4A on the second surface 210, reflectors 124 may be positioned in multiple locations/regions. Additionally, reflectors 124 may be positioned between the lenses 114-1 and 114-2.

Figure 5:
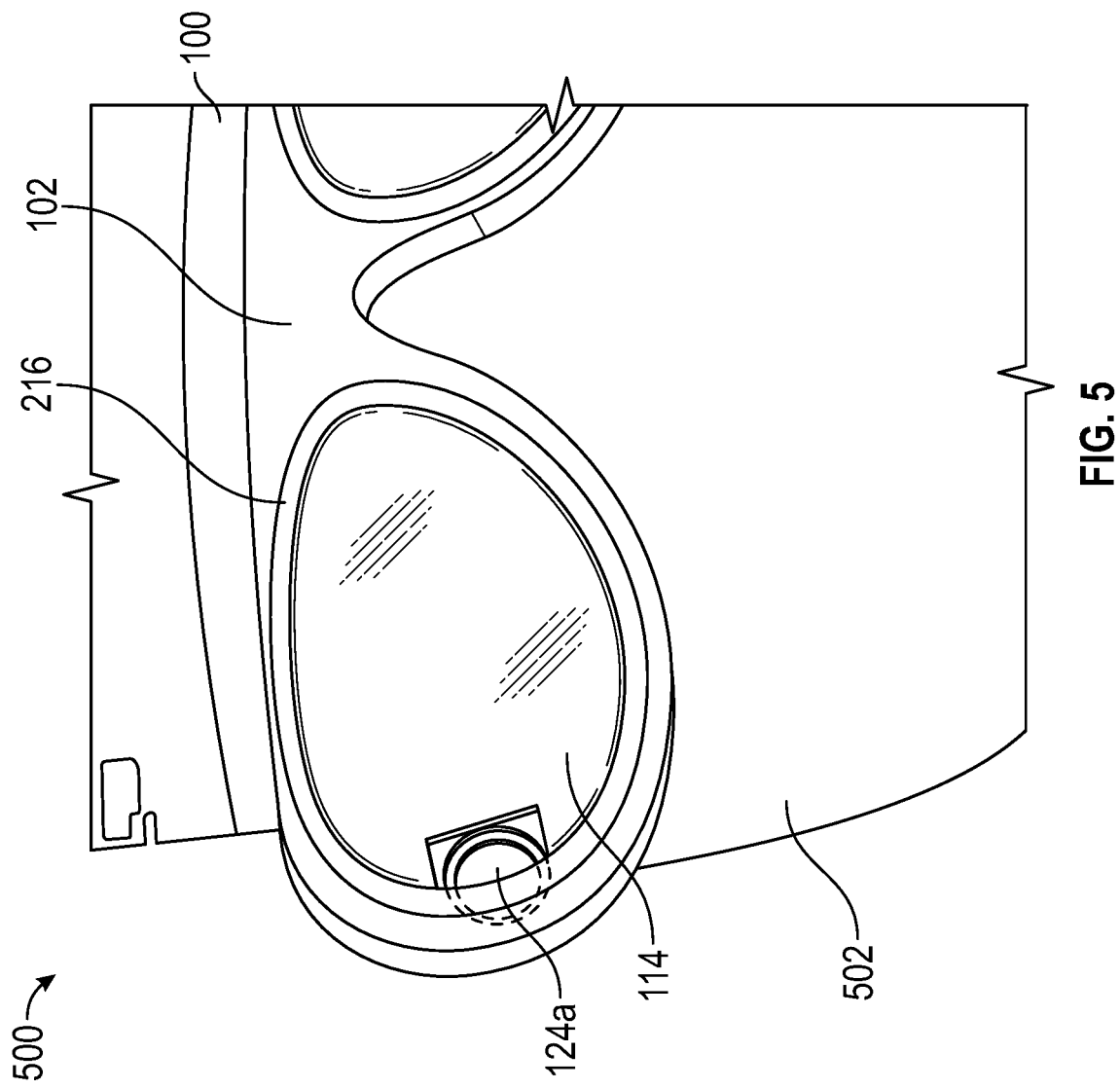
FIG. 5 is a perspective view of example eyewear with a reflector partially contained within the frame of the eyewear.

FIG. 5 depicts a system 500 including a working model of the eyewear 100 on a form 502 having the shape of a human head. The illustrated eyewear 100 depicts an example position of a reflector 124 a near a perimeter of a lens 114 supported by the frame 102 of the eyewear 100. The output coupler 216 is also visible on the lens 114.

Figure 6:
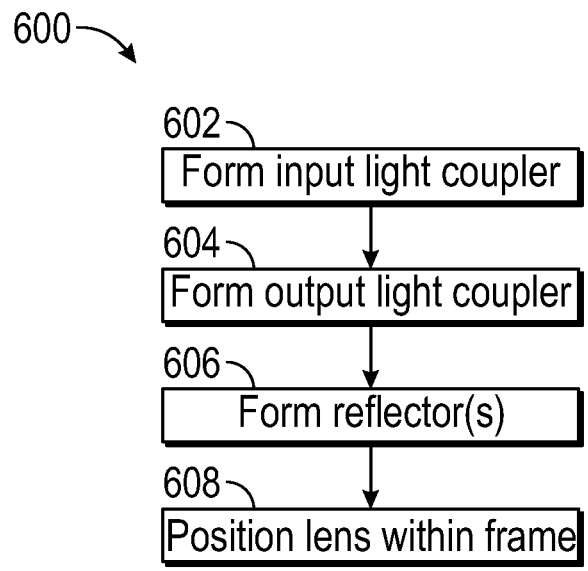
FIG. 6 is a flow chart illustrating an example method of forming a lens display.

FIG. 6 depicts a flow chart 600 of example steps for forming a lens display. The steps of flow chart 600 are described primarily with reference to the lens display of FIG. 2 for convenience. Other lens displays may be formed using the step of flow chart 600. Additionally, the steps of flow chart 600 may be performed in an order other than as depicted and/or one or more steps may be performed simultaneously.

At step 602, an input light coupler 204 is formed on a lens 114. The input light coupler 204 may be formed on a surface (e.g., a first surface 208) of the lens 114 to received light from the projector 122. The input light coupler 204 may be formed by depositing materials on the surface and/or by etching the surface. In examples where the projector 122 projects light into an edge of the lens 114 (e.g., as described above with reference to FIG. 4) this step may be omitted.

At step 604, an output light coupler 216 is formed on the lens 114. The output light coupler 216 may be formed on a surface (e.g., a first surface 208) of the lens 114 to guide light out of the waveguide 210. The output light coupler 216 may be formed by depositing materials on the surface and/or by etching the surface.

At step 606, a reflector 124 is formed on the lens 114 on a surface 210 opposite the input light coupler 204 and/or opposite the output light coupler 216. The reflector(s) 124 may be formed on a surface (e.g., a second surface 210) of the lens 114 to reflect at least a portion of the light reflected by the input light couple 204 and/or the output light coupler 216. The reflector 124 may be formed by depositing a reflective material on the surface 210 of the lens. In an example, the forming step includes the step of tuning the reflector 124. The reflector may be tuned to reflect a desired amount, e.g., at least 10 to 15 percent of the light in a viewable area and at least 90 percent of the light adjacent a perimeter of the lens 114. At step 608, the lens 114 is positioned within the frame 102.

Figure 7:
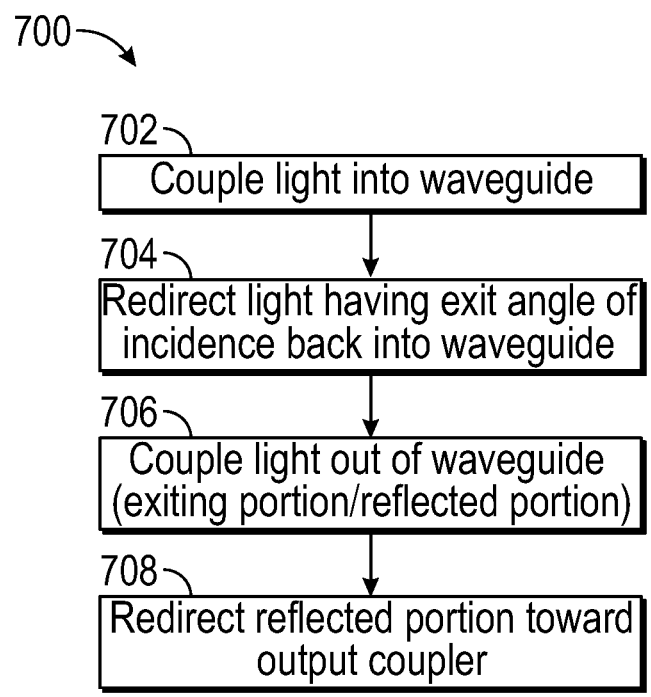
FIG. 7 is a flow chart illustrating an example method of using a lens display.

FIG. 7 depicts a flow chart 700 of example steps for the use of a lens display. The steps of flow chart 700 are described primarily with reference to the lens display of FIG. 2 for convenience. Other lens displays may be used with the steps of flow chart 700. Additionally, the steps of flow chart 700 may be performed in an order other than as depicted and/or one or more steps may be performed simultaneously.

At step 702, light is introduced to a waveguide 206 of a lens 114. In an example, the projector 122 introduces the light 202 to the waveguide 206 of the lens 114, e.g., via an edge of the lens or via an input coupling element 204 on a surface 208 of the lens 114. When an input coupling element 204 is used, at least two paths are created. The input coupling element creates a first path that is constrained by the waveguide and a second path having an angle of incidence with respect to the second surface of the lens 114 such that it would exit the waveguide in the absence of a reflector (i.e., an exit angle).

At step 704, a reflector 124 redirects light having an exit angle back toward the waveguide 206. In examples where an input coupling element 204 couples light into the waveguide 206, a reflector 124 is positioned to redirect light created by the input coupling element 204 that would exit the waveguide 206 in the absence of the reflector.

At step 706, light is coupled out of the waveguide 206 by an output coupling element 216. In an example, the output coupling element 216 creates at least two paths of light. The output coupling element 216 creates an existing portion that exits the waveguide 206 through the first surface 208 of the lens 114 toward the eye of a wearer and a reflected portion that is reflected toward the second surface 210 of the lens away from the eye of the wearer. The reflected portion has an angle of incidence with respect to the second surface 210 of the lens 114 such that it would exit the waveguide 206 in the absence of a reflector (i.e., an exit angle).

At step 708, at least a portion of the second portion of light that is directed away from the eye of a wearer in step 706 redirected/reflected by a reflector 124. In an example, at least a portion of the second portion of light that is redirected/reflected away from the eye of the wearer is reflected by the reflector 218. The reflector 218 reflects the portion of the second portion of light such that it rejoins the first portion of light from step 704 to increase the brightness.

Figure 8:
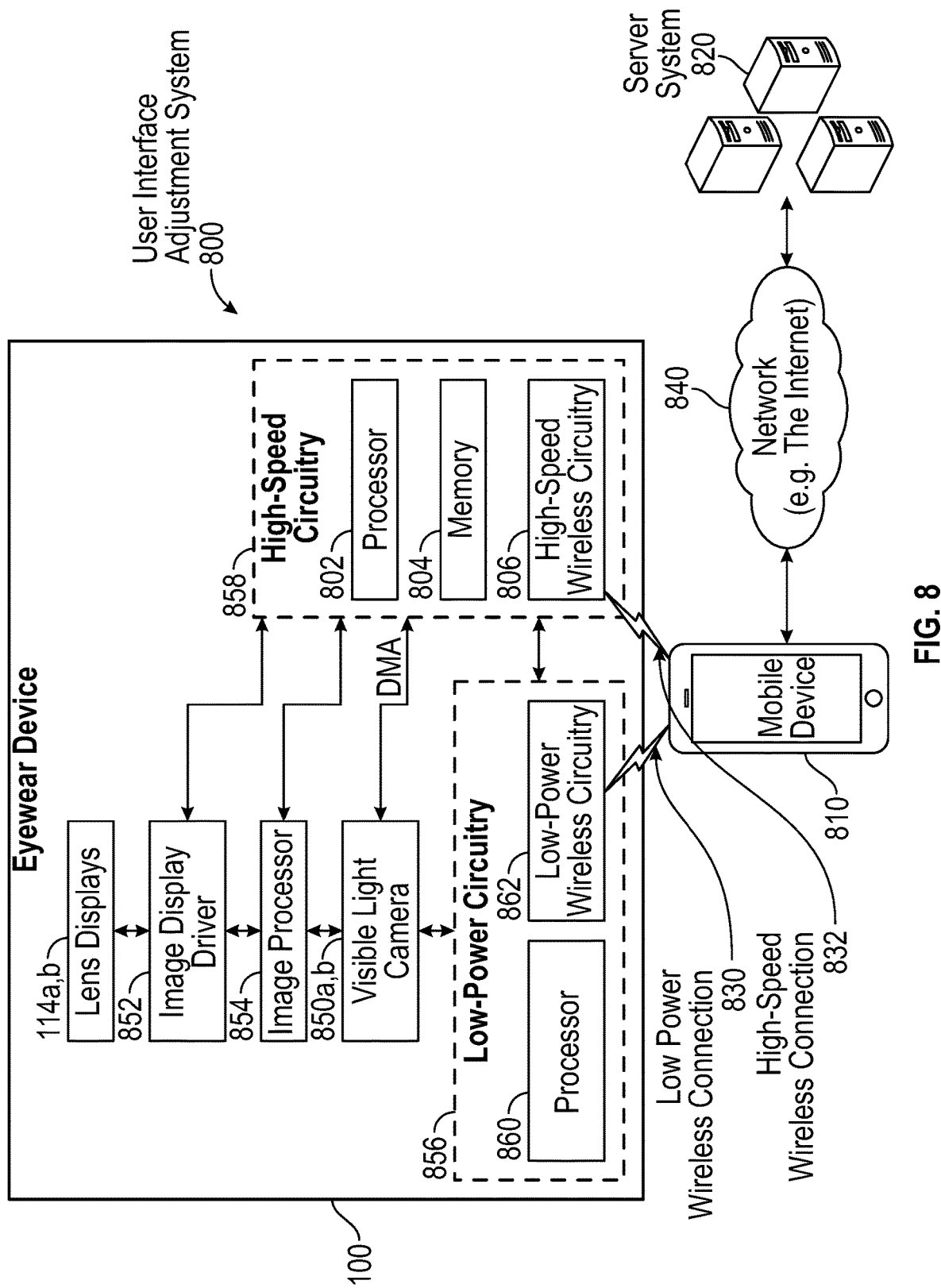
FIG. 8 is a block diagram of example electronics within an eyewear device in communication with a mobile device and a remote server system via the Internet.

FIG. 8 depicts a high-level functional block diagram including example electronic components disposed in eyewear 100. The illustrated electronic components include a processor 802 and a memory 804, which includes static and/or dynamic memory.

Memory 804 includes instructions for execution by processor 802 to implement functionality of eyewear 100. Processor 802 receives power from a battery (not shown) and executes instructions stored in memory 804, or integrated with the processor 802 on-chip, to perform functionality of eyewear 100 such as image processing, controlling operation of eyewear 100, and communicating with external devices via wireless connections.

A user system 800 includes a wearable device, which is the eyewear 100. The user system 800 also includes a mobile device 810 and a server system 820 connected via various networks. Mobile device 810 may be a smartphone, tablet, laptop computer, access point, or any other such device capable of connecting with eyewear 100 using both a low-power wireless connection 830 and a high-speed wireless connection 832. Mobile device 810 is connected to the server system 820 and a network 840. The network 840 may include any combination of wired and wireless connections.

The illustrated eyewear 100 includes at least two visible light cameras 850a, b, and two lenses 114a, b. Eyewear 100 also includes image display driver 852, image processor 854, low-power circuitry 856, and high-speed circuitry 858. The components shown in FIG. 8 for the eyewear 100 are located on one or more circuit boards, for example a printed circuit board (PCB) or flexible PCB, in the temples. Alternatively, or additionally, the depicted components can be located in the housing, frame, hinges, or bridge of the eyewear 100.

As shown in FIG. 8, high-speed circuitry 858 includes high-speed processor 802, memory 804, and high-speed wireless circuitry 806. In the example, the image display driver 852 is coupled to the high-speed circuitry 858 and operated by the high-speed processor 802 in order to drive the left and right lenses 114a, b. High-speed processor 802 may be any processor capable of managing high-speed communications and operation of any general computing system needed for eyewear 100. High-speed processor 802 includes processing resources needed for managing high-speed data transfers on high-speed wireless connection 832 to a wireless local area network (WLAN) using high-speed wireless circuitry 806. In certain embodiments, the high-speed processor 802 executes an operating system such as a LINUX operating system or other such operating system of the eyewear 100 and the operating system is stored in memory 804 for execution. In addition to any other responsibilities, the high-speed processor 802 executing a software architecture for the eyewear 100 is used to manage data transfers with high-speed wireless circuitry 806. In certain examples, high-speed wireless circuitry 806 is configured to implement Institute of Electrical and Electronic Engineers (IEEE) 802.11 communication standards, also referred to herein as Wi-Fi. In other embodiments, other high-speed communications standards may be implemented by high-speed wireless circuitry 806.

Low-power wireless circuitry 856 and the high-speed wireless circuitry 858 of the eyewear 100 can include short range transceivers (Bluetooth™) and wireless wide, local, or wide area network transceivers (e.g., cellular or WiFi). Mobile device 810, including the transceivers communicating via the low-power wireless connection 830 and high-speed wireless connection 832, may be implemented using details of the architecture of the eyewear 100, as can other elements of network 840.

Memory 804 includes any storage device capable of storing various data and applications, including, among other things, color maps, camera data generated by the left and right visible light cameras 850a, b and the image processor 854, as well as images generated for display by the image display driver 852 on the lens displays 114a, b. While memory 804 is shown as integrated with high-speed circuitry 850, in other embodiments, memory 804 may be an independent standalone element of the eyewear 100. In certain such embodiments, electrical routing lines may provide a connection through a chip that includes the high-speed processor 802 or a low-power processor 860 to the memory 804. In other embodiments, the high-speed processor 802 may manage addressing of memory 804 such that the low-power processor 860 will boot the high-speed processor 802 any time that a read or write operation involving memory 804 is needed.

Server system 820 may be one or more computing devices as part of a service or network computing system, for example, that include a processor, a memory, and network communication interface to communicate over the network 840 with the mobile device 810 and eyewear 100. Eyewear 100 may be connected with a host computer. For example, the eyewear 100 may be paired with the mobile device 810 via the high-speed wireless connection 832 or connected to the server system 820 via the network 840.

Output components of the eyewear 100 include visual components, such as the left and right lens displays 114a, b. The lens displays 114a, b are driven by the image display driver 852. The output components of the eyewear 100 further include acoustic components (e.g., speakers), haptic components (e.g., a vibratory motor), other signal generators, and so forth. The input components of the eyewear 100, the mobile device 810, and the server system 820, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear 100 may optionally include additional peripheral device elements. Such peripheral device elements may include biometric sensors, additional sensors, or display elements integrated with eyewear 100. For example, peripheral device elements may include any I/O components including output components, motion components, position components, or any other such elements described herein.

For example, biometric components may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components include acceleration sensor components (e.g., accelerometer), gravitation sensor components, rotation sensor components (e.g., gyroscope), and so forth. Position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 830 and 832 from the mobile device 810 via low-power wireless circuitry 862 or high-speed wireless circuitry 806.

According to some embodiments, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. Eyewear comprising:
a frame configured to be worn on a head of a user;
a projector supported by the frame, the projector configured to project light;
a lens supported by the frame, the lens having a first surface facing an eye of the user and a second surface facing away from the eye of the user when the frame is worn, the lens including at least one waveguide defined by the first and second surfaces and configured to receive the projected light;
an output light coupler for the at least one waveguide on the first surface of the lens that is positioned in a viewing area of the lens when the frame is worn to couple a first portion of the projected light out of the at least one waveguide toward the eye of the user and to reflect a second portion of the projected light into the at least one waveguide; and
a first reflector on the second surface of the lens opposite the output light coupler on the first surface of the lens, the first reflector positioned on the second surface in the viewing area of the lens to redirect back toward the output light coupler the second portion of the projected light from the output light coupler having an angle of incidence with respect to the second surface that would result in the second portion of the projected light exiting the at least one waveguide through the second surface in the absence of the first reflector, wherein the second portion of the projected light redirected by the first reflector is coupled by the output light coupler out of the at least one waveguide toward the eye of the user with the first portion of the projected light so as to increase brightness of the light projected toward the eye of the user.

2. The eyewear of claim 1,
further comprising an input light coupler on the first surface positioned adjacent a perimeter of the lens to couple light into the at least one waveguide; and
further comprising a second reflector positioned on the second surface adjacent the perimeter to redirect into the waveguide a first portion of the projected light from the input light coupler having an angle of incidence with respect to the second surface that would result in the first portion of the projected light from the input light coupler exiting the waveguide through the second surface in the absence of the second reflector.

3. The eyewear of claim 2, wherein the frame includes a housing containing the projector, the input light coupler, and the second reflector.

4. The eyewear of claim 1, where the lens further includes an edge between the first and second surfaces and wherein the projector is positioned by the frame to project the light into the at least one waveguide through the edge.

5. The eyewear of claim 1, wherein the at least one waveguide includes a first waveguide and a second waveguide, and the projector is configured to project a first spectrum of the light into the first waveguide and a second spectrum of the light into the second waveguide.

6. The eyewear of claim 1, wherein the at least one waveguide includes a first waveguide and a second waveguide and the at least one light coupler is configured to direct a first spectrum of the light into the first waveguide and a second spectrum of the light into the second waveguide.

7. The eyewear of claim 1, wherein the at least one reflector on the second surface of the lens is a mirror.

8. The eyewear of claim 7, wherein the at least one light coupler on the first surface of the lens is at least one of a diffractive grating, a diffractive coating, or a holographic grating.

9. The eyewear of claim 1, wherein the first reflector is coplanar to the at least one waveguide.

10. The eyewear of claim 1, wherein the first reflector is tuned to reflect 5 to 20 percent of the second portion of the projected light from the output light coupler.

11. A method for presenting an image on eyewear to be worn by a user, the eyewear having a lens including first and second surfaces defining at least one waveguide, the first surface facing an eye of the user and the second surface facing away from the eye of the user when the eyewear is worn, the method comprising:
  coupling, with an output light coupler on the first surface of the lens, a first portion of light including the image out of the at least one waveguide toward the eye of the user and reflecting a second portion of the light into the at least one waveguide; and
  redirecting back toward the output light coupler with a first reflector on the second surface of the lens opposite the output light coupler the second portion of the light received from the output light coupler having an angle of incidence with respect to the second surface of the lens that would result in the second portion of the light exiting the at least one waveguide through the second surface in the absence of the first reflector, wherein the second portion of the light redirected by the first reflector is coupled by the output light coupler out of the at least one waveguide toward the eye of the user with the first portion of the light including the image so as to increase brightness of the light including the image projected toward the eye of the user.

12. The method of claim 11, further comprising:
  coupling, with an input light coupler on the first surface, the light into the at least one waveguide; and
  redirecting, with a second reflector on the second surface, a portion of the light from the input light coupler into the waveguide having an angle of incidence with respect to the second surface of the lens that would result in the portion of the light from the input light coupler exiting the waveguide through the second surface in the absence of the second reflector.

13. The method of claim 12, further comprising:
  projecting the light onto the input light coupler.

14. The method of claim 11, wherein the first reflector is coplanar to the at least one waveguide.

15. The method of claim 11, wherein redirecting the second portion of the light received from the output light coupler further comprises redirecting 5 to 20 percent of the second portion of the light received from the output light coupler back toward the output light coupler.

16. A method for forming eyewear to be worn by a user, the method comprising:
  forming an output light coupler on a first surface of a lens, the output light coupler configured to at least one of couple light into a waveguide or couple light out of the waveguide, the output light coupler coupling a first portion of light including an image out of the waveguide toward an eye of the user and reflecting a second portion of light including the image into the waveguide; and
  forming a first reflector on a second surface of the lens opposite the output light coupler, the first reflector configured to redirect back toward the output light coupler the second portion of light from the output light coupler having an angle of incidence with respect to the second surface of the lens that would result in the second portion of the light exiting the waveguide through the second surface in the absence of the first reflector, wherein the second portion of the light redirected by the first reflector is coupled by the output light coupler out of the waveguide toward the eye of the user with the first portion of the light including the image so as to increase brightness of the light including the image projected toward the eye of the user.

17. The method of claim 16,
further comprising:
forming an input light coupler on the first surface adjacent a perimeter of the lens, the input light coupler adapted to couple light into the waveguide; and
forming a second reflector on the second surface of the lens adjacent the perimeter of the lens in an area that receives light from the input light coupler, the second reflector adapted to redirect a portion of the light from the input light coupler into the waveguide having an angle of incidence with respect to the second surface of the lens that would result in the portion of the light from the input light coupler exiting the waveguide through the second surface in the absence of the second reflector.

18. The method of claim 17, further comprising:
positioning the lens within a frame, the frame including a housing that covers the input light coupler and the second reflector.

19. The method of claim 16, wherein forming the at least one reflector comprises forming the first reflector to be coplanar to the waveguide.

20. The method of claim 16, further comprising tuning the first reflector to reflect 5 to 20 percent of the second portion of the projected light from the output light coupler.

* * * * *